July 6, 1965  J. B. PAMPLIN  3,192,799

TRANSMISSION DRIVE ELEMENTS

Filed Aug. 13, 1962  2 Sheets-Sheet 1

INVENTOR.
JAMES B. PAMPLIN
BY
Wm H. Maxwell
AGENT

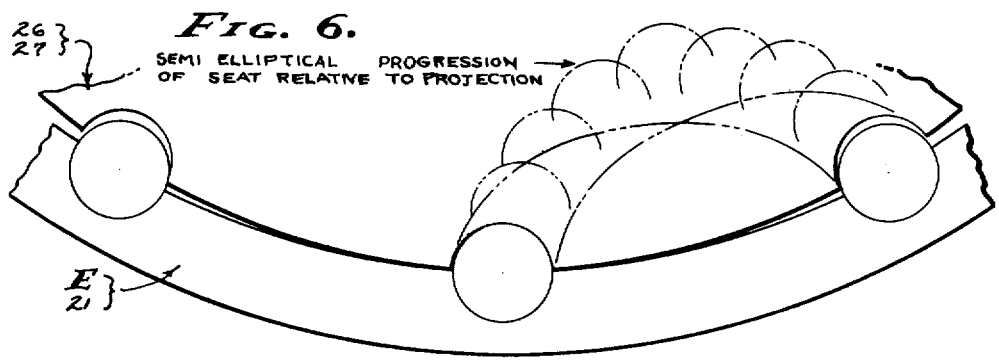
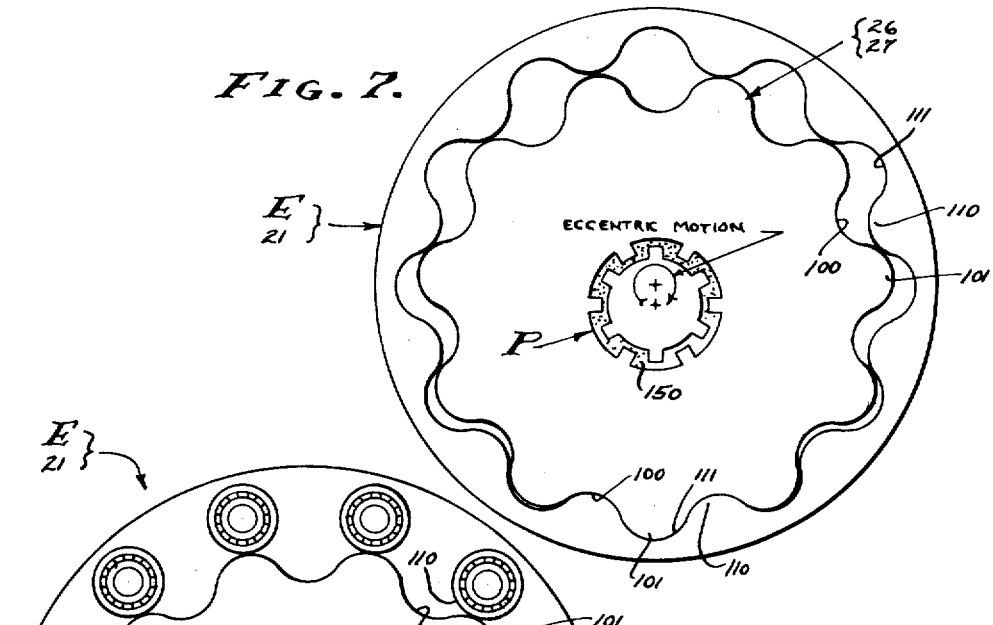
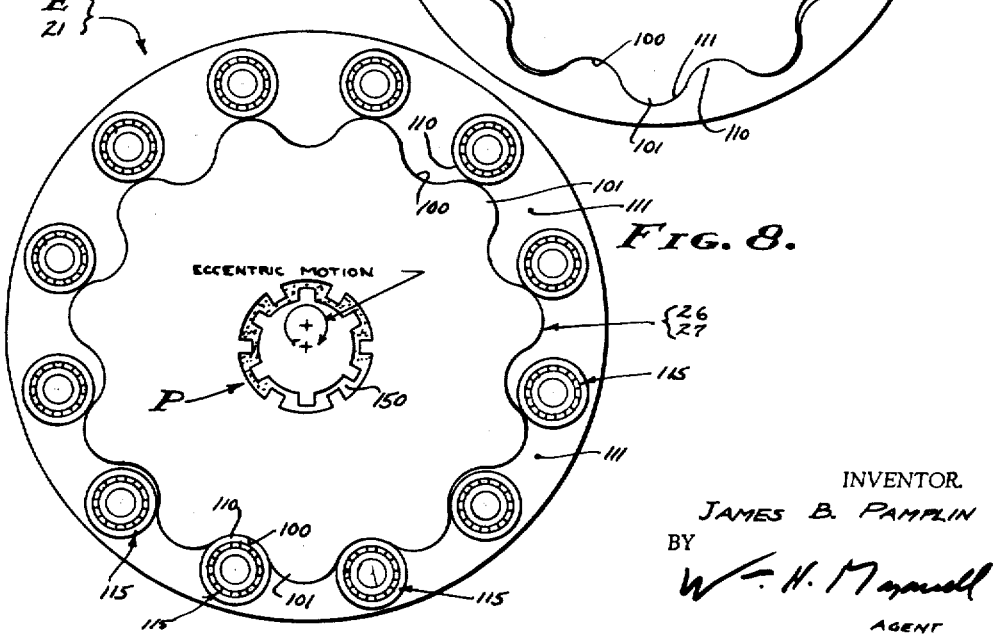

United States Patent Office 3,192,799
Patented July 6, 1965

3,192,799
TRANSMISSION DRIVE ELEMENTS
James B. Pamplin, Garden Grove, Calif., assignor to Paul Huska, Los Angeles, Calif.
Filed Aug. 13, 1962, Ser. No. 216,616
4 Claims. (Cl. 74—805)

This application is a continuation in part of my application Serial No. 184,043, filed April 2, 1962, now abandoned.

This invention relates to transmissions adapted to turn a driven shaft at a different rate than the turning of a drive shaft, and is particularly concerned with the engaged drive elements thereof.

A general object of this invention is to provide a small compact and durable transmission that involves few moving parts and in which minimum friction losses are incurred in the movement of the engaged drive elements thereof.

Speed changers are made for many special purposes and it is very often necessary to transmit heavy torque from a fast moving shaft to a slow moving shaft. As the speed ratios increase, the complexity and heft of common gear boxes becomes extraordinary. For instance, multiple sets of gears are resorted to, worm gearing with its frictional inherencies is resorted to, and generally large and cumbersome gear cases must be employed. Furthermore, it is common that ordinary gear reducers must have heat dissipators as a result of the frictional engagements of gear teeth that slide together as they intermesh. Also, ordinary gear reducers are plagued with "back-lash" problems due to the manner in which the gear teeth must slide together.

An object of this invention is to provide a transmission that is flexible in design capabilities and such as to be readily constructed for any desired speed reducing ratio and especially high order ratios.

Another object of this invention is to provide a speed changing transmission wherein the generation of heat is reduced to a minimum. With the drive elements that I provide there is little or no sliding engagement of the intermeshed and moving elements and with the result that friction is reduced to an infinitesimal value.

It is another object of this invention to provide a speed reducing transmission wherein one drive element operates eccentrically within the other and wherein there are projections on the outer element to engage with seats on the inner element, said projection and seat engagement to be distinguished from the intermeshing of like gear teeth. That is, the projections and seats do not slide together since the projections move into and out of engagement with the seats through semi-elliptical paths whereby the said projections enter and leave the seats in directions of movement tangent to the concaved periphery of the said seats.

Still another object of this invention is to provide a speed reducing transmission of the character thus far described that involves male and female parts of the simplest formation, for example the pin-shaped projections and semi-circular seats as shown in the first form of the invention herein disclosed.

It is still another object of this invention to provide a speed reducing transmission of the character thus far described that involves male and female parts of exacting mating configuration, for example semi-circular or sine wave shaped projections and seats as shown throughout the preferred forms of the invention herein disclosed.

It is still another object of this invention to provide a speed reducing transmission of the character thus far described and which includes one element employing a sine wave configuration and the other element of basically pin-shaped formation, and in one form comprising anti-friction roller pins for the reduction of friction and for the transmission of extremely high torque values.

With the embodiment shown in the first form of the invention there is immediate and direct speed reduction which involves but two sets of drive elements. Assuming that it is to be a reduction unit, the first set of drive elements immediately reduces the drive shaft rate while the second set of drive elements then increases said reduction as may be desired. In other words, there is first a loss in turning as effected by the first set of drive elements, simultaneously accompanied by an increase in turning as effected by the second set of drive elements. In order to effect a speed reduction in the same rotative direction, the said increase in turn is proportionately greater than the said loss in turning, whereby the driven shaft progresses a resultant proportion of turning in the same directions of turning as the drive shaft.

It is still another object of this invention to provide a transmission wherein back-lash is minimized and virtually eliminated, by virtue of the manner in which the projections enter and leave the seats where they can fit tightly, there being pressure exerting means in order to insure tightness without strain on the drive elements.

The various objects and features of this invention will be fully understood from the following detailed description of the typical preferred forms and applications thereof, throughout which description reference is made to the accompanying drawings, in which.

Figure 1:
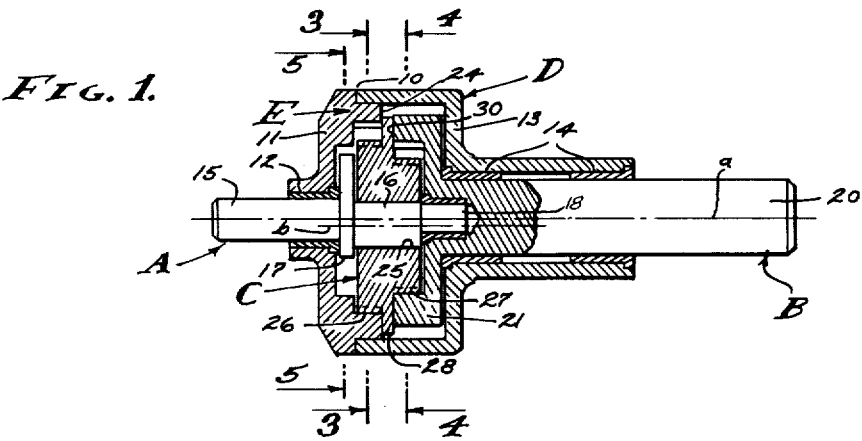
FIG. 1 is a longitudinal sectional view of a typical embodiment of the present invention.
Figure 2:
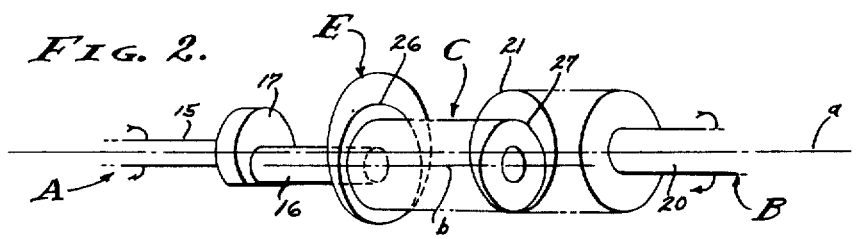
FIG. 2 is an exploded diagrammatic view showing the arrangement of elements of the speed reducing unit of FIG. 1.
Figure 3:
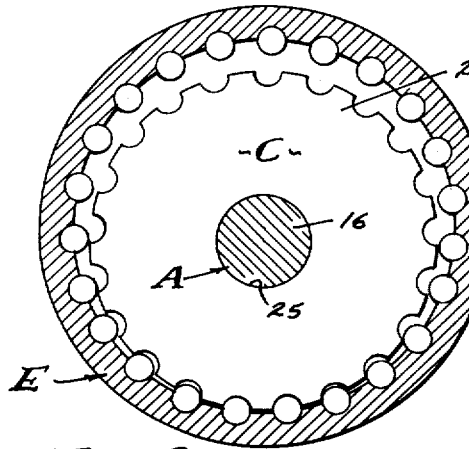
Figure 4:
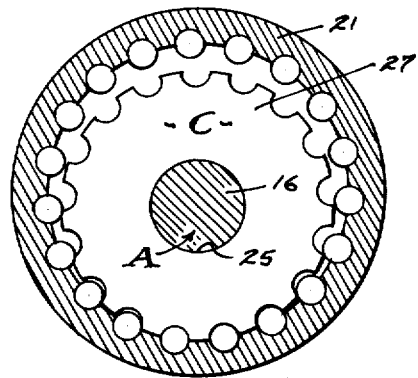

FIGS. 3 and 4 are enlarged sectional views showing the drive elements and taken as indicated by lines 3—3 and 4—4 on FIG. 1.

Figure 5:
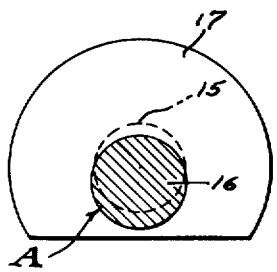

FIG. 5 is a view of the counterbalance and taken as indicated by line 5—5 on FIG. 1.

FIG. 6 is an enlarged detailed view illustrating the semi-elliptical path taken by the seat as it moves relative to the projection, the parts being proportionate substantially as shown in the first form of the invention.

FIG. 7 is a view similar to FIGS. 3 or 4 and showing a second form of the invention wherein the mating drive elements have an exacting corresponding and engaging form.

FIG. 8 illustrates a third form of the invention wherein one drive element has a sine wave formation and followed exactly by engaging rollers on the other drive element.

The speed reducer shown in FIGS. 1 through 5 is a differential planetary reduction drive that embodies the drive elements of the present invention. One speed ratio is illustrated and there is a single common internal planetary part. Broadly, this invention relates to a pair of eccentrically related drive elements, whether or not planetary action is involved and it is also feasible that said planetary element can progress about the external periphery of a sun element, rather than as shown.

Generally, the speed reducer involves, a drive element A, a driven element B, and a planetary element C. These three elements A, B and C are essentially the only moving elements required, and they operate within a case or housing D. Additionally, there is a drive element E in the case D, in the nature of a sun gear and in this instance in the nature of internal gear. A characteristic feature of the embodiment illustrated is that the drive element A, driven element B and drive element E are all on a common central axis $a$ extending longitudinally of the case.

The case or housing D is an elongate cylindrical shell separable end from end as at 10. The drive end of the case has a diametrically disposed wall 11 with a central bearing 12. The driven end of the case has a diametrically disposed wall 13 with central bearings 14. The bearings 12 and 14 are on said common central axis with opposed end thrust faces to position the three revolving elements therebetween. The case D is fixedly anchored for the operation of the unit.

The drive element E is referred to as being in the nature of a sun gear and is in the form of a ring with an equally spaced series of internal projections. As shown, the element E is formed in or carried by the wall 11 since it is associated with and is cooperatively related to the drive element A that enters the case D through the bearing 12. In the first form illustrated the drive element E has twenty-three projections.

The drive element A enters the case D as above described and comprises a drive shaft 15, an eccentric 16 and a balance 17 intermediate the shaft and eccentric. The said balance 17 is a flange-shaped part that has thrust engagement with the bearing 12 and this part is weighted diametrically opposite the throw of the eccentric 16, as indicated. The said eccentric 16 has its throw axis *b* laterally offset from and parallel with the axis *a*. The throw or radius of the eccentric 16 is dictated by and equal to the difference in pitch diameter between the drive element E and driving sprocket 26 hereinafter described. As shown, the eccentric 16 is a cylindrical bearing element that projects longitudinally from the flange part of the balance 17, and there is a projecting pilot 18 that projects further and enters the driven element B.

The driven element B enters the case D as above indicated and comprises a driven shaft 20 and a driven sprocket 21. Said sprocket 21 is a flange-shaped part that has thrust engagement with the bearing 14 and this sprocket, like the drive element E, is in the nature of an internal ring gear. However, sprocket 21 is adapted to turn whereas element E is fixedly positioned. As shown, there is a pilot opening in the sprocket 21 to center the throw end of the element A. In the case illustrated, driven sprocket 21 is a nineteen tooth element.

The planetary element C operates between and has coupled driving engagement with the drive element A, driven element B and also with the drive element E. In accordance with the invention, the element C is a disc-shaped part that involves a central bearing 25, this driving sprocket 26 and a drive sprocket 27. The said disc-shaped part comprising the element C is of such longitudinal extent as to occupy the case D intermediate the balance 17 and driven sprocket 21. The sprockets 26 and 27 are arranged adjacently and in the preferred form there is a bearing plate 28 projecting from and therebetween, and guided between peripherally disposed faces 24 and 30. The face 24 is at the inner side of the wall 11 while the face 30 is at the inner side of the sprocket 21. The plate 28 has sliding engagement with the opposed faces 24 and 30 as it is moved by the eccentric 16 through a planetary motion.

The driving sprocket 26 is smaller in pitch diameter than the fixed element E and is meshed therewith. In the case illustrated the driving sprocket 26 is a twenty-one tooth element.

The drive sprocket 27 is smaller in pitch diameter than the driven sprocket and is meshed therewith. In the case illustrated, the drive sprocket 27 is a seventeen tooth element.

The drive shaft of element A being turned, for example one revolution clockwise, the driving sprocket 26 progresses 2/21 revolution counterclockwise. The driving sprocket 26 being smaller than the fixed drive element E moves through its planetary motion reversely at a reduced rate as determined by the 23 to 21 ratio.

The planetary element C moving planetarily at said reduced rate of 2/21 is engaged with the driven sprocket 21 through the drive sprocket 27. The driven sprocket 21 being larger than said drive sprocket 27 moves reversely relative to said sprocket 27 in a forward direction of rotation (the same direction as drive shaft 15) at an increased rate as determined by the 19 to 17 ratio. The resultant speed reduction is the difference between the low of 2/21 in said first engagement and the gain of 2/19 is said second engagement multiplied by the ratio of sprockets 27 and 21, or 17/19. The product of these ratios is 136/6783 and with a final ratio at the driven shaft 20 of 49.875 to 1.

In accordance with the invention the sprockets are unique and I have illustrated very simple sprockets in the first form of the invention. One of said sprockets is an internal ring element having semi-circular convex peripheral forms that project radially inward, and the other of said sprockets is an external element having corresponding arcuate peripheral concavities to mesh with the said convex forms. Therefore, I refer to the drive elements as sprockets rather than as gears. The advantage of this specific convex and concave peripheral formation is that intermeshed engagement can be established between eccentrically related drive elements by using simple pin-shaped parts engaged with halves of drilled openings or the like.

As shown in FIGS. 1 through 5, and also in FIG. 6, pins are located in the female element E and sprocket 21 in order to establish convex projections, and openings are drilled to receive said pins. Openings are located in the male elements 26 and 27 in order to establish concave indentations. Both said pins and said openings are located by indexing methods for simplicity in machining and by so doing, production can be made by drilling a hole pattern in both sprocket elements followed by turning the peripheral diameters, internal and external respectively. Pins are then pressed into the openings of the female element so as to protude into the counterbored area shown clearly in FIG. 1, which accepts the semi-cular indentations of the male element. A drill press and a lathe is all that is required to manufacture these two elements.

Referring to FIG. 6 of the drawings the seat in the male sprocket (26–27) travels a semi-elliptical path as it progresses from one projection to another of the female sprocket (E–21). The seat leaves the projection tangent to the circular periphery thereof and travels away from the projection the distance of the full throw of the eccentricity between the male and female sprocket elements, and back again. At the same time the seat advances circumferentially of the projection a distance equal to the circumferential difference between the male and female sprocket elements. Therefore, the relationship of the eccentricity to the peripheral diameter of the female element (E–21) determines the path of the seat in the male element (26–27), and as a practical matter also determines the number of projections and seats to be used and the size or diameter thereof.

In FIGS. 1 through 6 there is but one projection completely seated at the one time and the direction of final seating engagement is radial and in the final analysis is exactly tangent to the semi-circular projection and seat formation. The diameter of the projection is in such relationship to the path of the seat that the seat does not touch the projection, in theory, until said projection and seat are radially aligned, and in a position in relationship to the eccentricity such as to be at the slowest movement position in its path of travel, such as for example, when a piston approaches the top of its stroke in a cylinder when driven by a crank. Therefore, there is a very short sliding engagement of parts at an extremely low rate of speed and with a great mechanical advantage through the near center effect of the eccentric when the projection and seat pass through radial alignment. Very little energy is expended through friction and the efficiency of this arrangement is much higher than that of gearing or chain drives that have sliding together to teeth, etc.

In FIG. 7 of the drawings I have shown a second form of the invention wherein continued sliding engagement is maintained between the plurality of projections and seats. The same semi-elliptical path of travel is involved with the rotative progression of the male element within the female element. In this form of the invention, however, the projections and seats are in contact at all times with the result that there is no backlash and wherein there is a maximum of power transmission capability.

The efficiency of this unit is extraordinary because the load, as normally carried by one single tooth of a gear, or the like, is in the case under consideration distributed over substantially 50% of the projections and seats. This reduces the load per square inch of work area in order to permit each projection and seat engagement to slide more readily on the lubricant film therebetween. Further, because this unit has the ability to transmit extraordinary power in comparison to its size, and because surface speeds of the working parts are so greatly reduced, all as above described, frictional losses are minimized and extreme efficiency is gained. Also, acceleration characteristics of this unit are improved. For example, with the first form of the invention, as described, and with the drive element A turning at a relatively high speed, the actual rotation of planetary element C is relatively slow and with the result that acceleration and deceleration can be made with facility. In other words, fast moving elements are avoided.

The form of invention shown in FIG. 7 might be objected to for the reason that there is continuous frictional engagement between the projections and the seats. Therefore, in FIG. 8 I have shown a third form of the invention wherein greater efficiency is effected by carrying the load on anti-friction bearings constantly in contact with the contour of the male sprocket (26–27). However, it is to be understood that said arrangement can be reversed, with the said bearings constantly in contact with the contour of the female sprocket (E–21). This form of the invention, with the continuous engagement of the projections with the seats, affords near perfect operation with smoothness, extraordinary torque capability, freedom from backlash, and with an overall high degree of efficiency.

In the two forms of the invention as shown in FIGS. 7 and 8, at least one of the drive elements has an undulating peripheral configuration comprising alternate concave and convex forms that continue one into the other. In each case there is a series of equally spaced seats 100 formed to a concave radius equal to the convex radius of the projection 110 with which it is to mate. Intermediate each seat 100 is a convex lobe 101 that projects on a radial and that corresponds to the semi-elliptical movement that occurs when the seat progresses from projection to projection. In each of the forms of invention illustrated in FIGS. 7 and 8 the projections 110 slide peripherally along the continuity of the seats 100 and intermediate lobes 101, and characteristically not more than 180° of the said projections 110 ever contact said seats and lobes. Thus, in FIG. 7 where the seats 100 include an arc of about 120°, then but 120° of the projections 110 ever make contact and with the result that the throat area 111 intermediate the projections 110 need not be employed, although the male and female elements are shown to have fitted engagement. This feature is all the more apparent in FIG. 8 wherein the anti-friction roller bearings 115 engage the convoluted periphery of the male drive element, all in the manner above specified.

It will be apparent from the foregoing that the pin forming the projections of the first form of the invention can enter the seats and depart therefrom without friction, or the projections of the male element can have continued sliding engagement with the seats and lobes of the female element, or anti-friction bearings can be employed in order to avoid frictional and sliding engagement, all as circumstances require.

In FIGS. 7 and 8 of the drawings I have shown a pressure exerting means P that insures tightness of the drive element engagement and which also permits deflection and discrepancies without adverse effect. Naturally, a pair of exactly fitted and mating drive elements is to be desired, but machine production being what it is, certain tolerances are to be expected. Therefore, an absolutely perfect pair of drive elements is more than likely impossible and which would at first glance indicate that absolute smoothness and freedom from back-lash is like-wise impossible. However, with the pressure exerting means P that I provide, the mating drive elements are permitted to be manufactured with either plus or minus tolerances without adversely affecting smoothness of operation and without creating back-lash. For instance, the male element or sprocket (26–27) can be slightly misshapen with no ill effect. As shown, the pressure exerting means P involves a resilient body 150 interposed between the drive element involved and its support. For instance, the drive element E can be resiliently mounted (not shown) in a body 150 of resilient material, or the drive element 21 can be resiliently mounted (not shown) in a body 150 of resilient material, or the male element 26–27 can be so mounted. In FIGS. 7 and 8 I have shown the male element 26–27 supported on a shaft 15–20 through a bushing or sleeve comprising a body 150 of resilient material, such as "Teflon" or of rubber or the like, said material being relatively stiff but capable of small movements designed to compensate for slight variations or discrepancies in the parts. Positive drive is made by radially overlapping lugs projecting from the male and female elements, whereby the body 150 drives through compressive forces applied circumferentially.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A transmission drive with two pairs of independently meshed elements, and including:
   (a) the first pair of said elements comprising a stationary element with an internal gear form and an element with an external gear form rotatable eccentrically within and in meshed engagement with the said internal gear form,
   (b) the second pair of said elements comprising a rotating element with an internal gear form and an element with an external gear form rotatable eccentrically within and in meshed engagement with the said internal gear form,
   (c) the two inner rotatable elements being revoluble on a radially resilient mounting and coupled to revolve eccentrically together on the common axis of the two internal gear elements, and each pair of elements comprising, one element having uniformly undulating and alternately concave seats and convex lobes, and the other element having uniformly spaced convex projections to engage constantly with said undulating seats and lobes of the said one element.

2. A transmission drive with two pairs of independently meshed elements, and including:
   (a) the first pair of said elements comprising a stationary element with an internal gear form and an element with an external gear form rotatable eccentrically within and in meshed engagement with the said internal gear form,
   (b) the second pair of said elements comprising a rotating element with an internal gear form and an element with an external gear form rotatable eccentrically within and in meshed engagement with the said internal gear form,
   (c) the two inner rotatable elements being revoluble on a radially resilient mounting and coupled to revolve eccentrically together on the common axis of the two internal gear elements, and each pair of elements comprising, one element with uniformly undulating and alternate concave seats and convex lobes, and the other element with uniformly circumferentially spaced cylindrical pin projections to engage constantly with said undulating seats and lobes of the said one element.

3. A transmission drive with two pairs of independently meshed elements, and including:
   (a) the first pair of said elements comprising a stationary element with an internal gear form and an element with an external gear form rotatable eccentrically within and in meshed engagement with the said internal gear form,
   (b) the second pair of said elements comprising a rotating element with an internal gear form and an element with an external gear form rotatable eccentrically within and in meshed engagement with the said internal gear form,
   (c) the two inner rotatable elements being revoluble on a radially resilient mounting and coupled to revolve eccentrically together on the common axis of the two internal gear elements, and each pair of elements comprising, one element with uniformly undulating and alternate concave seats and convex lobes, and the other element with uniformly circumferentially spaced roller projections to engage constantly with said undulating seats and lobes of the said one element.

4. A transmission drive with two pairs of independently meshed elements, and including:
   (a) the first pair of said elements comprising a stationary element with an internal gear form and an element with an external gear form rotatable eccentrically within and in meshed engagement with the said internal gear form,
   (b) the second pair of said elements comprising a rotating element with an internal gear form and an element with an external gear form rotatable eccentrically within and in meshed engagement with the said internal gear form,
   (c) the two inner rotatable elements being revoluble on a radially resilient mounting and coupled to revolve eccentrically together on the common axis of the two internal gear elements, and each pair of elements comprising, uniformly undulating and alternately concave seats and convex lobes constantly interengaged during relative eccentric motion between said elements.

References Cited by the Examiner

UNITED STATES PATENTS

| | | | |
|---|---|---|---|
| 820,789 | 5/06 | Hutchins | 74—461 |
| 1,773,568 | 9/30 | Braren | 74—804 |
| 1,833,993 | 12/31 | Hill | 74—804 X |
| 2,250,259 | 7/41 | Foote | 74—805 |
| 2,828,616 | 4/58 | Zeigler et al. | |
| 2,861,481 | 11/58 | Sundt | 74—804 X |
| 2,932,992 | 4/60 | Larsh | 74—804 |
| 3,056,315 | 10/62 | Mros | 74—805 |
| 3,073,184 | 1/63 | Braren | 74—804 |

OTHER REFERENCES

Machine Design, vol. 33, pages 135–137, 153, August 29, 1961.

DON A. WAITE, *Primary Examiner.*